US006974537B2

(12) United States Patent
Abdelqader

(10) Patent No.: US 6,974,537 B2
(45) Date of Patent: Dec. 13, 2005

(54) DIESEL FUEL PURIFIER

(76) Inventor: Ali Hasan Hamdan Abdelqader, P.O. Box 4213, Riyadh (SA) 1149147

( * ) Notice: Subject to any disclaimer, the term of this patent is extended or adjusted under 35 U.S.C. 154(b) by 82 days.

(21) Appl. No.: 10/718,330

(22) Filed: Nov. 19, 2003

(65) Prior Publication Data

US 2005/0103728 A1    May 19, 2005

(51) Int. Cl.[7] ............................................. B01D 35/18
(52) U.S. Cl. ...................... 210/86; 210/104; 210/114; 210/185; 210/248; 210/305; 210/311; 210/313; 210/323.1; 210/416.4; 210/443; 210/451
(58) Field of Search ................ 210/799, 774, 210/86, 97, 104, 109, 114, 116, 184, 185, 210/248, 295, 299, 305, 311, 312, 313, 323.1, 210/416.4, 435, 443, 451

(56) References Cited

U.S. PATENT DOCUMENTS

| | | | | |
|---|---|---|---|---|
| 1,468,906 A | * | 9/1923 | Inman ......................... 210/306 |
| 2,718,308 A | * | 9/1955 | Le Bus ...................... 210/532.1 |
| 3,144,407 A | * | 8/1964 | Olmos ......................... 210/307 |
| 3,465,883 A | * | 9/1969 | Jumper ........................ 210/307 |
| 3,931,011 A | * | 1/1976 | Richards et al. ............. 210/136 |
| 4,017,397 A | * | 4/1977 | Copeland ..................... 210/238 |
| 4,091,265 A | * | 5/1978 | Richards et al. ............. 219/501 |
| 4,132,646 A | * | 1/1979 | Bartlett et al. ............... 210/114 |
| 4,257,890 A | * | 3/1981 | Hurner ......................... 210/112 |
| 4,372,847 A | * | 2/1983 | Lewis ............................ 210/86 |
| 4,384,962 A | * | 5/1983 | Harris ......................... 210/788 |
| 4,387,691 A | * | 6/1983 | Marcoux et al. ............. 123/557 |
| 4,428,351 A | * | 1/1984 | Davis ........................... 123/557 |
| 4,430,222 A | * | 2/1984 | Walker ......................... 210/477 |
| 4,437,986 A | * | 3/1984 | Hutchins et al. ............. 210/130 |
| 4,470,301 A | * | 9/1984 | Hutchins et al. ........... 73/304 R |
| 4,485,622 A | * | 12/1984 | Takagi et al. .................. 60/296 |
| 4,497,714 A | * | 2/1985 | Harris ......................... 210/788 |
| 4,565,629 A | * | 1/1986 | Wilson et al. ............... 210/248 |
| 4,624,779 A | * | 11/1986 | Hurner ......................... 210/180 |
| 4,855,041 A | * | 8/1989 | Church et al. ............... 210/120 |
| 4,995,992 A | * | 2/1991 | Hurner ......................... 210/803 |
| 5,052,178 A | * | 10/1991 | Clerc et al. .................... 60/274 |
| 5,110,460 A | * | 5/1992 | Gilas ........................... 210/149 |
| 5,212,948 A | * | 5/1993 | Gillingham et al. ........... 60/288 |
| 5,401,404 A | * | 3/1995 | Strauss ......................... 210/265 |
| 5,454,945 A | * | 10/1995 | Spearman .................... 210/315 |
| 5,471,964 A | * | 12/1995 | Hurner ......................... 123/514 |
| 5,582,154 A | * | 12/1996 | Hurner ......................... 123/549 |
| 5,776,332 A | * | 7/1998 | Hurner .......................... 210/95 |
| 5,809,777 A | * | 9/1998 | Kawamura .................... 60/303 |

(Continued)

Primary Examiner—Robert James Popovics
(74) Attorney, Agent, or Firm—Welsh & Katz, Ltd.; Thomas R. Vigil, Esq.

(57) ABSTRACT

The diesel purifier produces a fuel of high purity that meets the full ignition requirements at the combustion chamber of the engine. The purifier comprises a purification chamber encapsulated by an external body of the unit wherein, the purification chamber has a barrier with conical and cylindrical parts surrounded by a filter, such that fuel flows from the unit inlet through a pipe to the conical part, further wherein the upper part of the unit has a relief valve, the lower part has a heating element, and a water sensor connectable to sound and light indicators at a cabin dash board, and at the bottom there is a drain valve and filter, which is secured at the outlet of the unit. The above purification process depends on causing of some differences in the density of contaminants which contributes towards the settling of heavy impurities and the light contaminants are separated by a wire filter assembly.

7 Claims, 3 Drawing Sheets

U.S. PATENT DOCUMENTS

| | | | |
|---|---|---|---|
| 5,837,132 A * | 11/1998 | Hurner | 210/95 |
| 5,916,442 A * | 6/1999 | Goodrich | 210/311 |
| 5,993,675 A * | 11/1999 | Hagerthy | 210/799 |
| 6,015,492 A * | 1/2000 | Popoff et al. | 210/238 |
| 6,203,698 B1 * | 3/2001 | Goodrich | 210/311 |
| 6,402,948 B1 * | 6/2002 | Pakki et al. | 210/223 |
| 6,555,000 B2 * | 4/2003 | Knight | 210/416.4 |
| 6,797,168 B1 * | 9/2004 | Knight | 210/497.01 |
| 2003/0116490 A1 * | 6/2003 | Keyster et al. | 210/184 |
| 2004/0069694 A1 * | 4/2004 | Gamble et al. | 210/85 |
| 2004/0104159 A1 * | 6/2004 | Benavides et al. | 210/311 |
| 2005/0000876 A1 * | 1/2005 | Knight | 210/235 |
| 2005/0016905 A1 * | 1/2005 | Lindow | 210/120 |
| 2005/0056586 A1 * | 3/2005 | Ross et al. | 210/512.1 |
| 2005/0103728 A1 * | 5/2005 | Abdelqader | 210/774 |

* cited by examiner

DIESEL FUEL PURIFIER

BACKGROUND OF THE INVENTION

1. Field of the Invention

The present invention relates to a diesel fuel purifier.

2. Description of the Related Art

Diesel Fuel is used for operation of almost all types of light and heavy equipment including vehicles, road construction equipment, tractors, farming equipment, metallurgy equipment, oil prospecting equipment, electrical generators, trains, boats, ships, and military equipment, etc. Diesel contamination is one of the most factors that have an adverse effect on engine performance. For that specific reason, primary filters are used for solid waste as well as secondary filters for the fine contaminants, and traps may be used for separation of water from the fuel. However, these filters are still ineffective and cannot cope with the frequent contamination of the fuel.

Such filters and traps may be the only solution available at present for purification of the diesel fuel, but the problem about such devices is that they have to be periodically replaced and need periodical maintenance.

These conventional filters and water traps are capable to a certain extent to produce relatively clean fuel free from water and contaminants, but still they may be not able to remove the solid waste of less than 5 micron, and wax build-up especially during cold weather, which in most cases causes a total or partial blockage of such filters, which interferes with the fuel flow and ultimately negatively reflected on the engine itself due to lack of proper combustion.

To cope with this problem, the diesel engine employs electrical heating elements inside the combustion chamber for heating of air prior to starting of the engine, and another heating element is used in the purifier to improve fuel and generate load currents that contribute towards precipitation and separation of contaminants and eliminate wax build-up, which is positively reflected on ignition process and performance of the engine.

BRIEF SUMMARY OF THE INVENTION

The object of the present invention is tackle the problems associated with the diesel fuel contaminants, to reduce pollution and maintenance to the minimum, and to maximize engine performance thanks to the relatively full ignition inside the combustion chamber.

It is also an object of the present invention to produce fuel of high purity, and make available a fuel purifier that is relatively maintenance free compared to conventional filters and traps currently in use.

The diesel fuel purifier of the present invention is mainly designed for use at the cold countries because it does not need two heating elements (inside the combustion chamber and in fuel filter system).

According to a first aspect of the invention there is provided a diesel purifier unit comprising a purification chamber encapsulated by an external body of the unit wherein, the purification chamber has a barrier with conical and cylindrical parts Surrounded by a wire filter, such that fuel flows from the unit inlet through a pipe to the conical part, further wherein the upper part of the unit has a relief valve, the lower part has a heating element, and a water sensor connectable to sound and light indicators at a cabin dash board, and at the bottom there is a drain valve and filter, which is secured at the outlet of the unit.

According to a second aspect of the invention there is provided a diesel purifier comprising a purification chamber encapsulated by an external body of the unit wherein, the purification chamber has a barrier with conical and cylindrical parts surrounded by a filter, such that fuel flows from the unit inlet through a pipe to the conical part, further wherein the upper part of the unit has a relief valve, the lower part has a heating element, and a water sensor connectable to sound and light indicators at a cabin dash board, and at the bottom there is a drain valve and filter, which is secured at the outlet of the unit and wherein the external body and the fuel inlet pipe and cylindrical and conical parts and are made by forming black steel sheet, and upper and lower covers are formed by moulding, and place for relief valve (9), heating element, water cock and drain valve are formed by hydraulic devices.

According to another aspect of the invention, there is provided a diesel fuel purifier unit having an external body having a fuel inlet pipe for the introduction of contaminated diesel fuel, a purified diesel fuel outlet for the passage of a purified diesel fuel, and a drain outlet for the draining of accumulated contaminants, both said inlet and said purified diesel fuel outlet being situated in an upper portion of the external body; a purification chamber encapsulated by said external body, said purification chamber having a barrier with a conical and a cylindrical portion; a first wire filter surrounding the conical portion of said barrier; a second wire filter filling a portion of an annular region between said cylindrical barrier portion and said fuel inlet pipe, said first and second wire filters dividing said purification chamber into a filtered region and unfiltered region; a relief valve connected to an upper portion of the external body; a heating element connected to a lower portion of the external body; a water level sensor connectable to sound and light indicators at a cabin dashboard for detecting the level of accumulated contaminants; and a drainvalve connected to the bottom of the external body at said drain outlet, to permit accumulated contaminants to be drained from the purification chamber; wherein contaminated diesel fuel to be treated flows through the fuel inlet pipe to said conical portion, where the contaminated diesel fuel comes into contact with said heater and is permitted to settle by gravity into a diesel fuel stream and a contaminant layer, said diesel fuel stream then passing through one of said first and second wire filters to said purified diesel fuel outlet.

Preferred aspects and features of the invention may be defined in the claims, attached hereto, which claims are hereby made part of the disclosure of the invention.

Further insight into the advantage and characteristics of the claimed invention can be gained from the following description of preferred embodiments.

BRIEF DESCRIPTION OF THE SEVERAL VIEWS OF THE DRAWINGS

The figures of the drawings, briefly described below, demonstrate characteristics of the diesel purifier, by way of example only.

DETAILED DESCRIPTION OF THE INVENTION

The invention is directed to a diesel purifier that produces a fuel of high purity that meets the full ignition requirements at the combustion chamber of the engine.

It should be noted that any reference to unit or purifier shall mean in this text a preferred device according to this invention.

Figure 1:
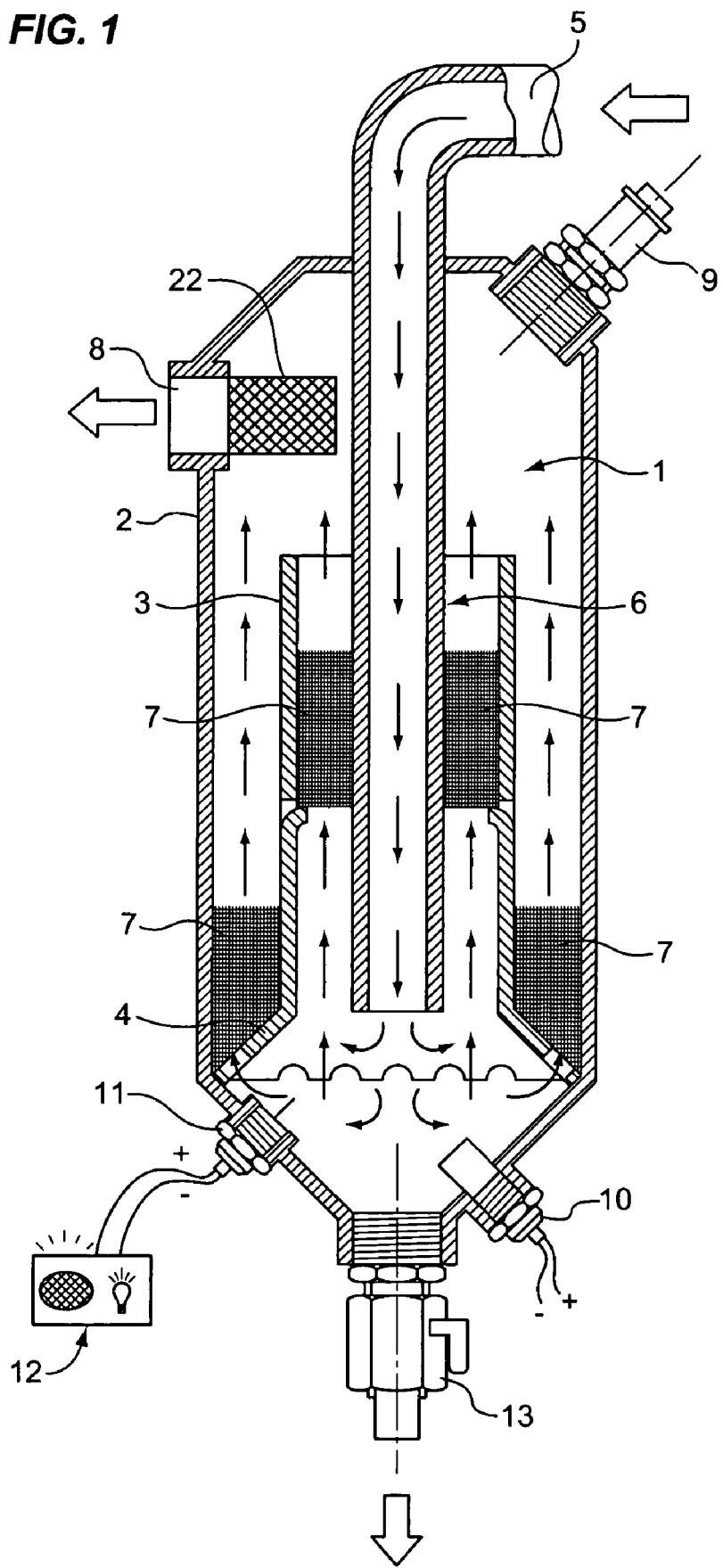
FIG. 1 is a longitudinal cross sectional view of the subject matter purifier.

The invention is demonstrated in details on the attached drawings, and FIG. 1 is a longitudinal section of the subject matter purifier. The device mainly comprises a purification chamber (1) which is encapsulated by the external body of the device (2), the purification chamber (1) has a cylindrical tapered section (3) at (4) which is encapsulated by a wire filter (7) (shown in FIGS. 4-A, 4-B.

Figure 4A:
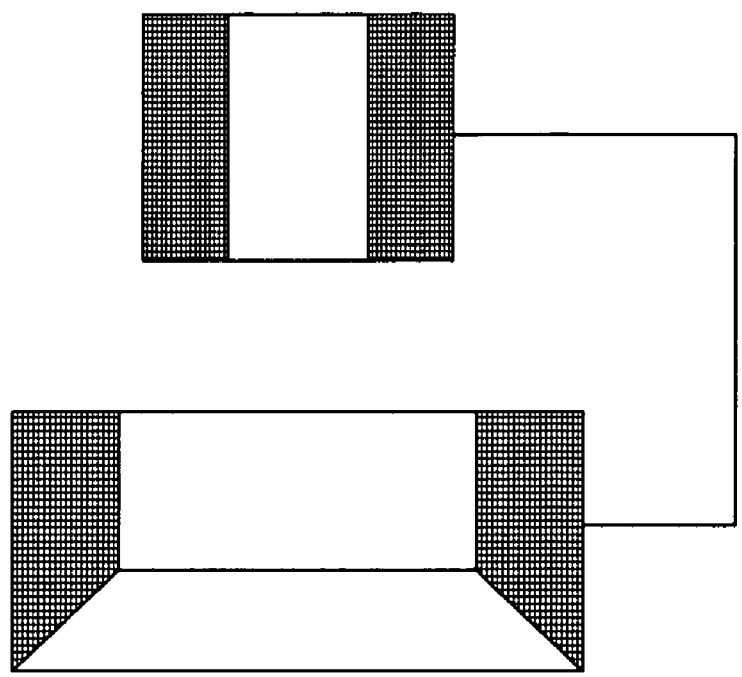
FIGS. 4-A and 4-B are sketches showing the wire filters in use.
Figure 4B:
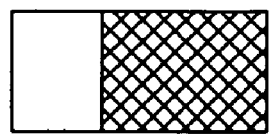

Fuel goes through pipe (6) to fuel inlet (5) up to the conical part shown in FIG. 4-A, 4-B where it is warmed by the heating element (10) up to a certain temperature, which makes warm fuel to escape to the wire filter (7) then to the outlet (8) through the final filter (22) which exists just before the outlet. The upper part of the device has a relief valve (9), the lower part has a heating element (10) and a water cock (11) which is connected to sound and light indicators (12) at the vehicle dash board, and the bottom of the device has a drain valve (13).

The cylindrical body (2) and fuel inlet pipe (6) and other cylindrical conical parts (3) and (4) are made of black steel sheet, upper and lower covers and holes and the space for the relief valve (9) the heating element (10), water cock (11) and drain valve (13) is formed by a hydraulic device. Once cylindrical parts are formulated and the above valves are at place, grinding shall take place to the connected parts, and the device shall be cleaned by the appropriate solvents, tightness and leaking tests for the device shall be conducted by using pressurized air at (7) bar, then the successful unit shall be treated with the appropriate paint, and the units which are intended for marine use shall be coated with marine grade humidity and corrosion proof paint.

Relief valve (9), heating element (10), drain valve (13) and water cock (11) are all secured by a clamp. To eliminate any leaking a gasket (not shown in the diagram) is used for installation of these valves. These parts can be installed also by pressing or riveting or any generally accepted method.

Figure 2:
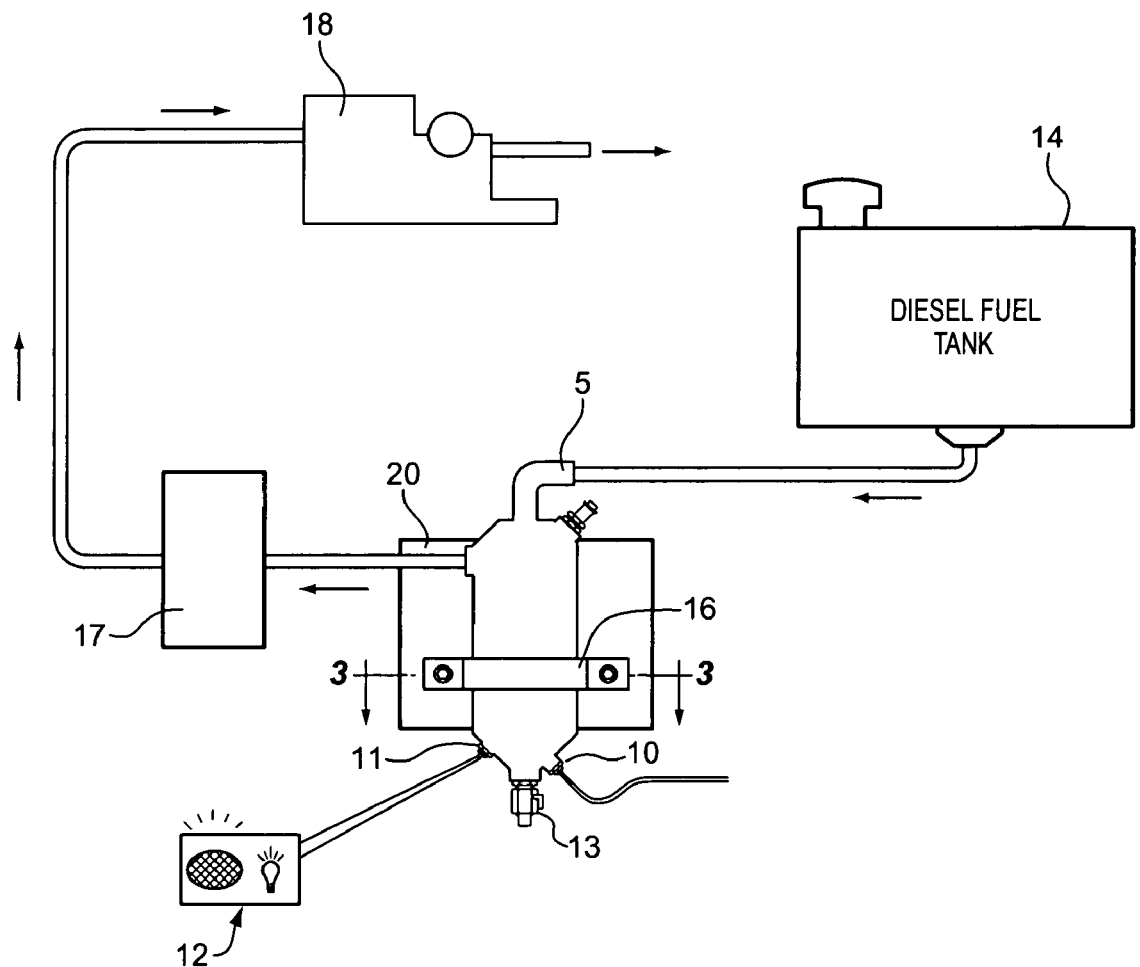
FIG. 2 is a diagram showing where to install the purifier in a fuel system.

FIG. 2 shows in detail how to install the unit in the fuel system of the vehicle. Fuel flows from the fuel tank (14) in the direction of the arrow (15) to the unit inlet (5) which has a relief valve (9), heating element (10) and water cock (11) which is connected to sound and light indicators at the dash board (12) and drain valve (13). The unit is secured by band (16).

The diesel fuel is purified in the unit and the pure diesel goes out of the outlet (8) through the primary filter (17), then to the injection pump (18) then to the engine (not shown on the diagram).

Figure 3:
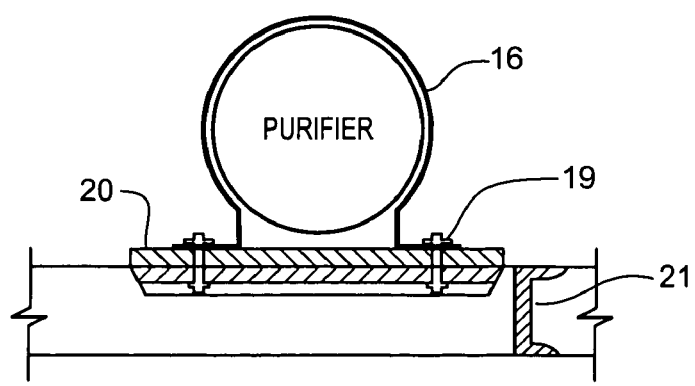
FIG. 3 is a sectional view taken along the line A—A in FIG. 2 above and shows how to fix the purifier by a bracket on the main frame of the vehicle.

FIG. 3 shows how the unit is installed at the vehicle. It is secured by a steel clamp (16) fixed by screws (19) on the U-shaped bracket (20) at the vehicle frame (21).

Using a purifier according to the invention will result in many advantages including for example:

Reduces carbon black to minimum thanks to full fuel combustion. Protects the sensitive parts of the fuel system including injectors, injection devices, thanks to improvement of the warm fuel lubrication characteristics (which is optimum at 36° C.).

It eliminates build-up of sulphuric acid thanks to separation of water from the fuel.

FIG. 4 shows the best place for installation of the unit, which is the fuel supply line, and after the main fuel tank which allows direct flow to the purifier.

Fuel is totally purified in the subject matter unit, fuel flows into the unit through the inlet (5) then down to the conical part (4) where it is affected by the heating element (10) which generates load currents due to fluctuation of temperature, which consequently affect the density of solid waste and fuel, which contributes towards settling of water and solid waste at the bottom, nearby the drain valve (13). Warm fuel is directed to the wire filters (7), which separate light contaminants, and fuel continues to flow towards the outlet (8) where a final filtration takes place through filter (22), which is fixed at the unit outlet. The result is a pure fuel free from water and contaminants.

The above purification process depends on causing of some differences in the density of contaminants which contributes towards settling of heavy impurities and the light contaminants are separated by the wire filter assembly. Such difference in density is created by heating of fuel at a confined area at the lower part of the unit. Once the appropriate temperature is reached, heavy contaminants and water precipitate, warm fuel flows towards the outlet through the wire filters that separate light contaminants.

Separated contaminants build-up at the bottom of the unit close to drain valve (13) where they accumulate up to certain level which is detected by sensor (11), at that point the sensor operates triggering out a warning light and an alert system declaring the time for drain of contaminants.

Contaminants are easily drained on opening of the upper relief valve (9), and the lower valve (13). Once drain is completed, relief valve and drain valve shall be tightly closed.

Drain mechanism can be modified to operate automatically by replacing it with solenoid valve.

It should be noted that many changes and modifications can be made to this invention without affecting the main concept of this invention.

Throughout the specification, unless the context requires otherwise, the word "comprise" or variations such as "comprising", will be understood to imply the inclusion of a stated integer or group of integers but not the exclusion of any other integer or group of integers.

I claim:

1. A diesel fuel purifier unit comprising:

an external body having a fuel inlet pipe for the introduction of contaminated diesel fuel, a purified diesel fuel outlet for the passage of a purified diesel fuel, and a drain outlet for the draining of accumulated contaminants, both said inlet and said purified diesel fuel outlet being situated in an upper portion of the external body;

a purification chamber encapsulated by said external body, said purification chamber having a barrier with a conical and a cylindrical portion;

a first wire filter surrounding the conical portion of said barrier;

a second wire filter filling a portion of an annular region between said cylindrical barrier portion and said fuel inlet pipe, said first and second wire filters dividing said purification chamber into a filtered region and unfiltered region;

a relief valve connected to an upper portion of the external body;

a heating element connected to a lower portion of the external body;

a water level sensor connectable to sound and light indicators at a cabin dashboard for detecting the level of accumulated contaminants; and a drainvalve connected to the bottom of the external body at said drain outlet, to permit accumulated contaminants to be drained from the purification chamber;

wherein contaminated diesel fuel to be treated flows through the fuel inlet pipe to said conical portion, where the contaminated diesel fuel comes into contact with said heater and is permitted to settle by gravity into a diesel fuel stream and a contaminant layer, said diesel fuel stream then passing through one of said first and second wire filters to said purified diesel fuel outlet.

2. A diesel purifier unit according to claim 1, wherein the external body and the fuel inlet pipe and cylindrical and conical parts are made by forming black steel sheet, and upper and lower covers are formed by moulding, and place for relief valve, heating element, water cock and drain valve are formed by hydraulic devices.

3. A diesel purifier unit according to claim 1, wherein connected parts are subject to grinding, and then the unit is cleaned by ordinary solvents; further wherein tightness against leaking is tested under pressurized air of 7 bars, and then the unit is coated by an appropriate paint.

4. A diesel purifier unit according to claim 3, wherein unit intended for marine use is coated with anti-corrosion.

5. A diesel purifier unit according to claim 1, wherein the relief valve, the heating element, drain valve, and water sensor are secured by a clamp, and to ensure tightness and a gasket is used for installation of any these valves.

6. A diesel purifier unit according to claim 5, wherein relief valve, heating element, drain valve, and water cock are secured by riveting.

7. A diesel purifier unit according to claim 1, wherein wire filters are made of aluminium wires.

* * * * *